Dec. 16, 1969    R. H. McGUINNESS    3,484,647

DISPLAY APPARATUS

Filed Jan. 26, 1968

INVENTOR.
RAYMOND H. McGUINNESS
BY Bruce C Lutz

ATTORNEY

United States Patent Office 3,484,647
Patented Dec. 16, 1969

1

3,484,647
DISPLAY APPARATUS
Raymond H. McGuinness, Seattle, Wash., assignor to Honeywell Inc., Minneapolis, Minn., a corporation of Delaware
Filed Jan. 26, 1968, Ser. No. 700,888
Int. Cl. H01j 29/70
U.S. Cl. 315—22                 10 Claims

ABSTRACT OF THE DISCLOSURE

A plan position display apparatus including additional circuitry for cross modulating the sweep signal to enhance the visibility of the signal as a function of range.

The present invention is related generally to electronics and more specifically to a circuit for improving the display presentation of a position display apparatus.

In the prior art, a plan position display presentation could not always be made visible under adverse lighting conditions without the possibility of damaging the display surface such as the phospher in a cathode ray tube (CRT). Further, even under normal lighting conditions, the prior art displays were not adequately visible from any substantial distance.

The present invention therefore comprises circuitry for and the concept of cross modulating or broadening the sweep in accordance with the signal, which is presented, simultaneously with the intensity modulation of the sweep due to that signal. To obtain satisfactory overlap under all conditions, the broadening is proportional, in one embodiment, to the range of the target. While it is not necessary to provide the cross modulation only during input signal reception, the embodiment shown operates in this mode to prevent cluttering of the display.

It is therefore an object of the present invention to provide an improved circuit for displaying information of the position display type and more particularly of the plan position display type.

Further objects and advantages of this invention may be ascertained from a reading of the specification and appended claims in conjunction with the figures wherein:

Figure 1:
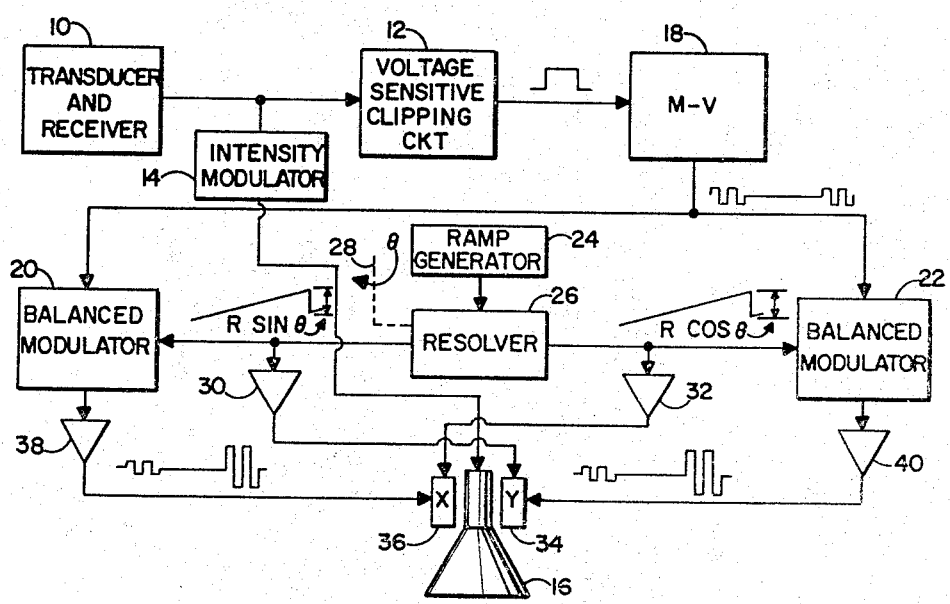
FIGURE 1 is a block diagram of one embodiment of the invention.

In FIGURE 1 a transducer and receiver 10 supplies an input signal to a voltage sensitive clipping circuit or Schmitt trigger 12 and an intensity modulator 14. The output of the intensity modulator 14 is supplied to intensity modulate a CRT or other position display means 16. The clipping circuit 12 supplies a clipped signal to a multivibrator 18 which provides an output of a high frequency compared to the frequency of the input pulses to first and second balanced modulators 20 and 22 respectively. These modultors may be of the type shown on p.

2

170 of a 1963 Texas Instrument Design Manual published by McGraw-Hill. A ramp generator circuit 24 supplies ramp signals to a resolver 26. The resolver changes in phase angle with respect to a reference via an input shown as dash line 28. The output of the resolver comprises a train of ramps or sweep signals which sinusoidally vary in amplitude in accordance with the position of input 28. A first output is designated as $R \sin \theta$ and is supplied to an amplifier 30 and to the balanced modulator 20. A second output $R \cos \theta$, whose amplitude variation is in quadrature with the signal supplied to balanced modulator 20, is supplied to an amplifier 32 and to balanced modulator 22. The output of amplifier 30 is supplied to a Y deflection means 34 of CRT 16. The deflection means 34 may be either a coil or plate or any other means for producing a deflection of the signal to be displayed. An output of amplifier 32 is supplied to an X deflection means 36 of CRT 16. An output of modulator 20 is supplied to an amplifying means 38 whose output is supplied to deflection means 36. An output of balanced modulator 22 is supplied through an amplifier 40 to the Y deflection means 34.

Figure 2:
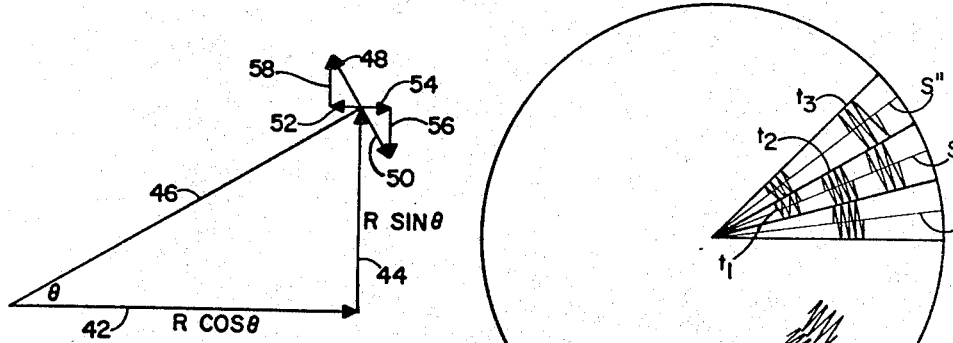
FIGURE 2 is a vectorial addition of signals in an attempt to more clearly illustrate the method of operation of the circuit of FIGURE 1.

In FIGURE 2 a first signal $R \cos \theta$ (42) is represented by a vector similarly designated which is representative of the instantaneous amplitude of the signal at a given point in time in the operation of the apparatus. $R \sin \theta$ (44) is representative of a signal supplied to balanced modulator 20 at the same instant. Vector 46 is indicative of the resultant of vectors 42 and 44. Vector 46 is the signal which would result from a combination of the signals supplied to the X and Y deflection means of the CRT from amplifiers 30 and 32. Vectors 52 and 54 representative of the cross modulation vectors which are obtained by modulating the input signal by a signal representative of vector 44 and applying it to the X input to produce vectors 52 and 54. Modulation of the input signal by vector 42 produces new vectors 56 and 58. The signal comprising vectors 56 and 58 are then supplied to the Y input. Vectors 52 and 58 result in vector 48 while vectors 54 and 56 result in vector 50.

Figure 3:
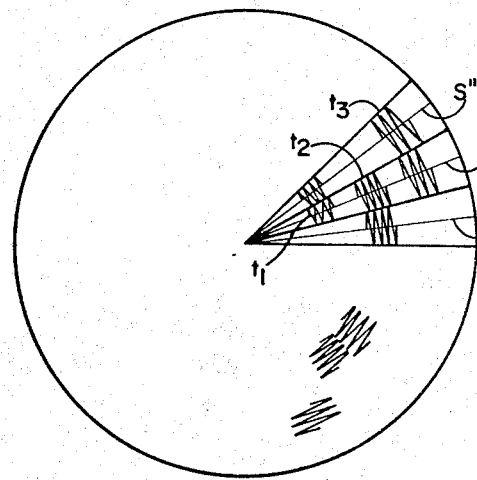
FIGURE 3 is an illustration of the display which may be presented on a CRT utilizing the present invention.

Referring to FIGURE 3 it will be noted that line S is intended to represent the line of sweep for a given direction of display. At time $t_1$ near the beginning of the sweep cycle, a target or input signal is supplied to modulate the outward going sweep signal at right angles thereto. Since the cross modulation signal is of a high frequency compared to the outward going sweep signal, the outward going signal will move only a short distance during the time that it takes to move sideways several times. At the end of the input signal, the sweep signal returns to a narrow line of low intensity and continues towards the outside of the scope. At time $t_2$ a second input is received indicative of the second target and again modulation occurs. However, at this time the modulation is greater so as to provide continuity with a similar cross modulation during a previous sweep S' which also receives a signal at time $t_2$ in the outward sweep cycle. At time $t_3$ in the sweep, a third modulation is obtained. A sweep S'' is also shown to illustrate the following sweep presentation. Other targets recently swept are also shown in FIGURE 3.

As will be noted, as the sweep continues towards the outside of the scope, the modulation becomes greater so that there is slight overlap between target signals for the various sweep presentations.

Although substantially the same display effect can be obtained by greatly increasing the sweep frequency and reducing the angular displacement between adjacent sweeps it is not always practical to reduce this angular displacement for other reasons. One such reason is that in Sonar the speed of sound is so slow that to obtain the brightness on the scope face anywhere comparable to the brightness obtained by the present method by merely intensity modulating, would require that the total time for the sweep to traverse the entire face of the scope would be so long as to negate usefulness of the apparatus for navigation or high speed searching.

While the operation of FIGURE 1 is substantially apparent from the previous descriptions of the prior art and FIGURES 2 and 3 it will be briefly stated. An input signal is applied through modulator 14 to intensity modulate CRT 16 when an input is received. Simultaneously therewith the clipping circuit 12 will pass signals greater than a predetermined amplitude and clip them to a second predetermined amplitude. The multivibrator 18 upon reception of the clipped signal will oscillate at a frequency, which in one embodiment was approximately 2 kHz., and supply this constant amplitude signal to the balanced modulators 20 and 22. The duration of this alternating or oscillating signal is substantially the same as the duration of the input signal. The ramp generator circuit 24 provides sweep signals of a relatively low frequency compared to 2 kHz. and in one embodiment the sweep was approximately one cycle per second. These signals which have the same frequency as the desired sweep signals are supplied to resolver 26 which provides two outputs the amplitude of which are related as shown by the output designations $R$ sine $\theta$ and $R$ cosin $\theta$. That is, an envelope of their amplitudes are in a phase quadrature relationship. The change in angle may be done electronically but is shown as a mechanical input 28. The signal $R$ sine $\theta$ is directly applied to the Y deflection means 34 to produce a deflection of the sweep signal in the Y direction. Simultaneously, $R$ cosin $\theta$ is supplied to the X coil to produce the deflection in the X direction. Also, $R$ sine $\theta$ is used to amplitude modulate the alternating signal from multivibrator 18 in balanced modulator 20 so that the output signal supplied to amplifier 38 is very small at the beginning of a sweep and quite large at the end of a sweep. This signal is supplied to deflection means 36 to produce an X deflection in accordance with the Y signal amplitude. A similar situation occurs for the $R$ cosine $\theta$ signal which is used to modulate the signal from the multivibrator 18 in modulator 22 and the result of which is applied to deflection means 34. As shown in FIGURE 2, this simple changing of inputs to modulate the opposite deflection channels produces a cross modulation.

As will be realized, the maximum cross modulation rate which can be used depends upon the frequency response of the deflection system. Further, internal adjustment means within the circuit such as amplifier means 38 and 40 may be used to adjust the amount of cross modulation to suit individual operator preference.

In summary, the present invention provides two advantages over the prior art. One is that the target visibility is increased and the second is that the target presentations may be made to appear continuous rather than as a discrete series of stripes. While it will be obvious to one skilled in the art that the invention need not be as complicated as shown since the embodiment shown does not produce cluttering of the display, etc. I intend to be limited not by the disclosure but only by the scope of the appended claims.

I claim:

1. Display apparatus comprising, in combination:
    deflection modulated display means including X and Y signal inputs, the display output being position modulated in accordance with the relative amplitudes and polarities of signals applied to said inputs;
    sweep means for supplying amplitude modulated first and second sweep signals whose amplitude modulation differs by a predetermined phase angle;
    input means for supplying target signals to be displayed;
    first modulation means connected to said sweep means and said input means for receiving said first and second sweep signals and target signals therefrom and connected to said X signal input means for supplying thereto a signal representative of said first sweep signal as cross modulated by a modulated combination of said target signals and said second sweep signal; and
    second modulation means connected to said sweep means and said input means for receiving said first and second sweep signals and target signals therefrom and connected to said Y signal input means for supplying thereto a signal representative of said second sweep signal as cross modulated by a modulated combination of said target signals and said first sweep signals.

2. Apparatus as claimed in claim 1 wherein each of said modulation means includes balanced modulator means and means for vectorially summing the one sweep signal with the combination of signals to produce the cross modulation.

3. Apparatus as claimed in claim 1 comprising in addition:
    means for intensity modulating the display means in accordance with the amplitude of the target signals.

4. Apparatus as claimed in claim 3 wherein the display means is a cathode ray tube means including deflection means connected to said X and Y inputs.

5. Apparatus as claimed in claim 4 wherein the apparatus includes means for producing a plan position modulated display and the input means includes means for modulating said target signals at a high frequency compared to the frequency of said sweep signals.

6. Apparatus of the class described comprising, in combination:
    cathode ray display means;
    circuit means for providing plan position intensity modulated sweep signals wherein the intensity of modulation is representative of the amplitude of an input signal;
    means connecting said circuit means to said display means for supply modulated sweep signals thereto; and
    cross modulation means connected to said circuit means for modulating the sweep width only at times concurrent with intensity modulation, and wherein the sweep width modulation increases as a function of range.

7. Apparatus as claimed in claim 6 wherein said cathode ray display means includes X and Y deflection means; and
    said cross modulation means comprises means for amplitude modulating the input signal by an X sweep signal for application to the Y deflection means and means for amplitude modulating the input signal by a Y sweep signal for application to the X deflection means.

8. Apparatus as claimed in claim 7 wherein said display means is a tube and the sweep signals supplied to said X and Y deflection means from said circuit means are amplitude modulated in a quadrature relationship.

9. Cathode ray tube plan position display apparatus incorporating sweep deflection signals having the relationship of $R \cos \theta$ and $R \sin \theta$ which are applied respectively to X and Y deflection means wherein R is the maximum possible amplitude of the sweep signal and $\theta$ is the desired display angle with respect to a reference and further including means for intensity modulating a presentation on the display in accordance with an input signal comprising in addition:

means for modulating the input signal by the $R \sin \theta$ signal and applying it to the X deflection means while simultaneously modulating the input signal by the $R \cos \theta$ signal and supplying it to the Y deflection means.

10. Apparatus as claimed in claim 9 comprising in addition clipping means for clipping the input signal to a constant amplitude and multivibrator means for converting the clipped signal to an alternating signal of a duration substantially equal to said input signal and of an alternating frequency substantially higher than the frequency of said sweep signals.

References Cited

UNITED STATES PATENTS

| 2,640,191 | 5/1953 | Earp et al. | 343—10 |
| 2,653,312 | 9/1953 | Haworth | 343—5 |
| 2,754,508 | 7/1956 | Ehrenfried | 343—11 |
| 3,307,141 | 2/1967 | Saxton et al. | 343—11 X |

RODNEY D. BENNETT, JR., Primary Examiner

BRIAN L. RIBANDO, Assistant Examiner

U.S. Cl. X.R.

315—24